INVENTOR.
RICHARD C. WOODWARD, JR.
BY
Flam and Flam
ATTORNEYS.

Jan. 26, 1965  R. C. WOODWARD, JR  3,167,674
EDDY CURRENT COUPLING

Filed Feb. 19, 1962  3 Sheets-Sheet 2

INVENTOR.
RICHARD C. WOODWARD, Jr.
BY
Flam and Flam
ATTORNEYS.

Jan. 26, 1965  R. C. WOODWARD, JR  3,167,674
EDDY CURRENT COUPLING

Filed Feb. 19, 1962  3 Sheets-Sheet 3

INVENTOR.
RICHARD C. WOODWARD, JR.
BY
Flam and Flam
ATTORNEYS.

United States Patent Office 3,167,674
Patented Jan. 26, 1965

3,167,674
EDDY CURRENT COUPLING
Richard C. Woodward, Jr., Fullerton, Calif., assignor, by mesne assignments, to Emerson Electric Co., a corporation of Missouri
Filed Feb. 19, 1962, Ser. No. 174,184
2 Claims. (Cl. 310—105)

This invention relates to couplings, and more particularly to eddy current couplings.

In such couplings, a magnetic flux is produced by a winding, which flux has a path through a relatively rotary drum and rotor.

Either of these elements may be the driving member; eddy currents are induced in the other member, as long as there is a differential speed between them. The greater the speed difference, the greater the eddy current flow, with an attendant increase in the torque exerted on the driven member.

It is one of the objects of this invention to provide a compact apparatus of this character, and particularly by providing a series of relatively angularly movable surfaces on the rotary members, arranged longitudinally of the axis of rotation. Thus the overall diameter of the apparatus can be kept within reasonable limits, the clutch being nevertheless capable of transmitting a relatively large torque.

It is one of the objects of this invention to provide a compact apparatus of this character, and particularly by providing a series of relatively angularly movable surfaces on the rotary members, arranged longitudinally of the axis of rotation. Thus the overall diameter of the apparatus can be kept within reasonable limits, the clutch being nevertheless capable of transmitting a relatively large torque.

It is another object of this invention to provide simple cooling provisions for the apparatus; such cooling is essential in view of the relatively large eddy current flow in the relatively rotating parts.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings.

Figure 1:
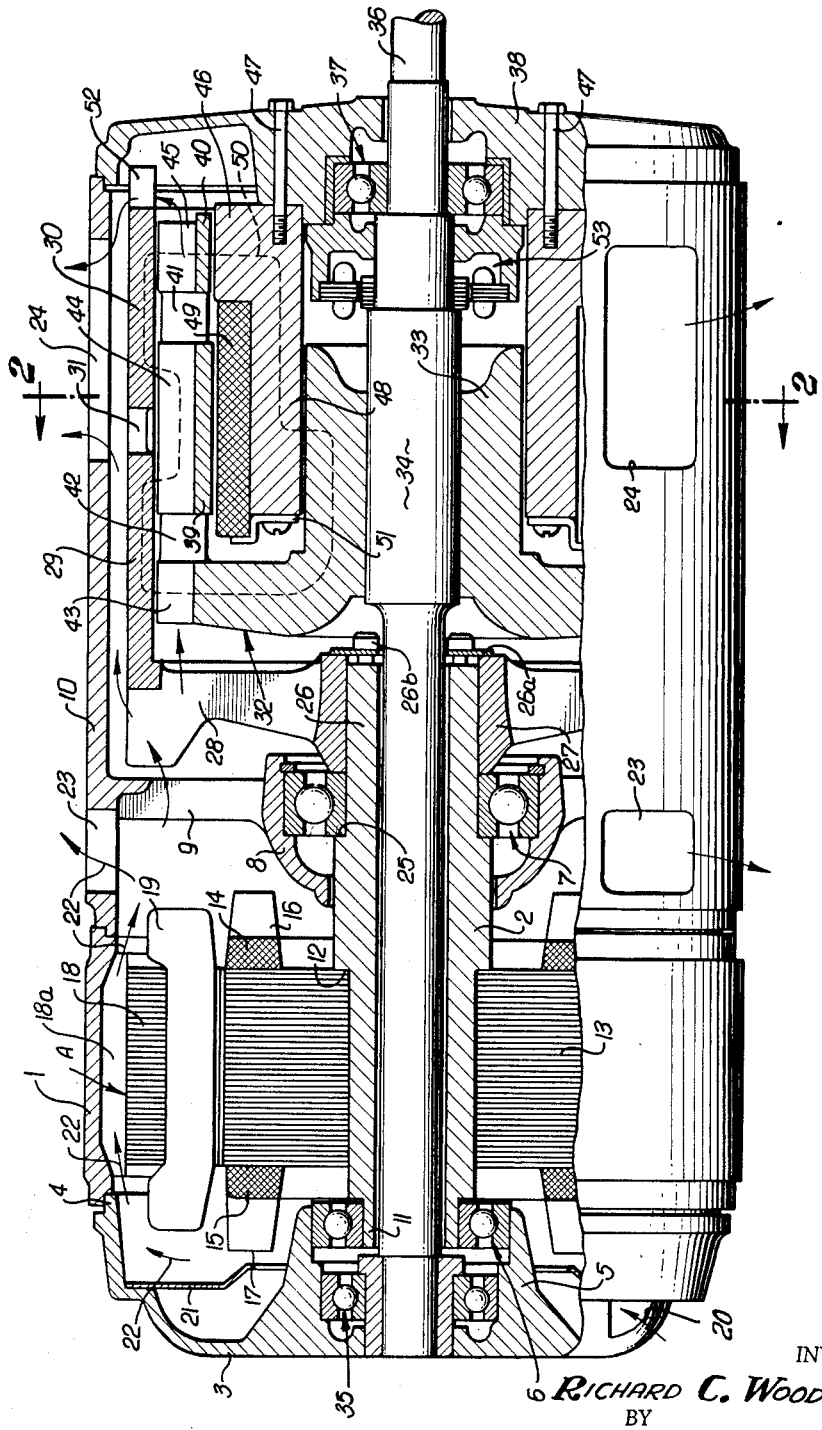
FIGURE 1 is a view, mainly in longitudinal section, of an eddy current coupling incorporating the invention.
Figure 2:
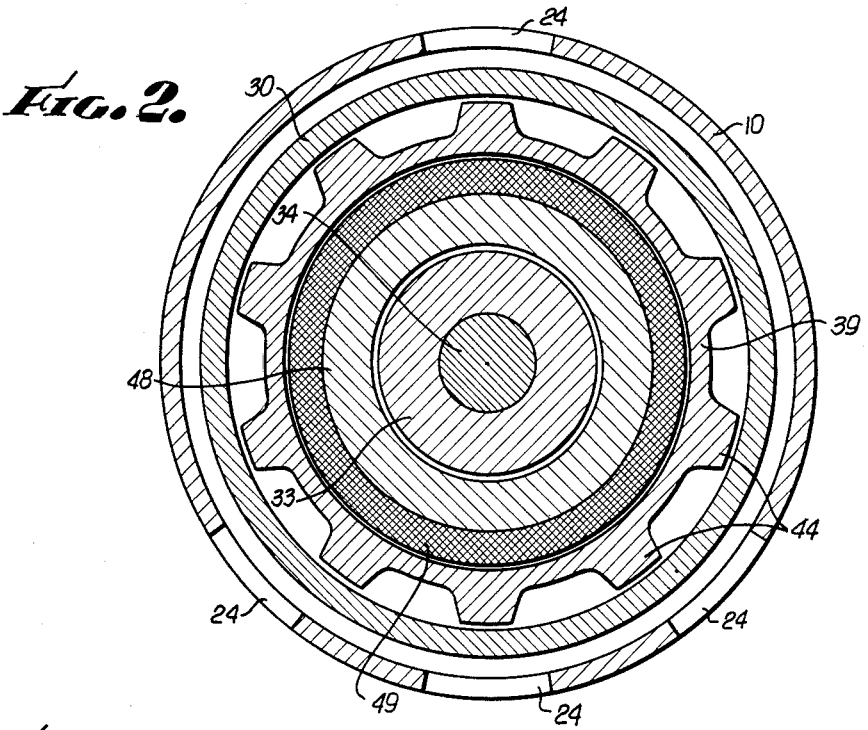
FIG. 2 is a sectional view, taken along the plane corresponding to line 2—2 of FIG. 1.

In the form of the invention shown in FIGS. 1 and 2, an induction motor A is provided for rotating a driving shaft 2. Frame 1 of the motor A is joined to an end bracket 3 in any appropriate manner, as for example, by telescoping the flange 4 of the end bracket 3 within the open left hand end of the frame 1.

A central boss 5 of the end bracket 3 serves to support a ball bearing structure 6 for the hololw shaft 2.

The hollow shaft 2 is also supported by the aid of a ball bearing structure 7 mounted in a central hub 8 formed in a bracket 9 shown as integrally joined to a frame or casing 10 which houses the coupling structure proper. The inner race of structure 7 abuts a shoulder 25 on shaft 2.

The left hand end of the hollow shaft 2 is provided with a reduced portion 11 for accommodating the inner race of the ball bearing structure 6. A shoulder 12 is also formed on the shaft 2 for the accommodation of the rotor laminations 13. These laminations are provided with slots in the usual manner to accomodate a squirrel cage winding, as of copper or aluminum. This winding may have end rings 14 and 15 having fan vanes 16 and 17 for providing ventilation.

The stator laminations 18 are appropriately supported in frame 1 and carry the stator windings 19 shown diagrammatically in the drawings. These stator laminations may be provided with a series of vents 18a for providing a path for ventilating air.

The bracket 3 may have air inlet openings 20 as well as a deflector plate 21 for causing air to flow in the path indicated by the arrows 22 through vent openings 18a and ultimately through outlet openings 23 in casing 10. Some of the air is also passed into the casing 10 and exits via several outlet openings 24.

The reduced right hand portion 26 of the shaft 2 accommodates the hub 27 of a rotary drum structure forming one of the elements of the eddy current coupling. This hub is held in place by a disc 26a overlapping the right hand fan of hub 26 and held in place by screws 26b threaded into the right hand end of shaft 2. The rotary drum structure includes arms 28 forming a spider and two annular drum elements 29 and 30 made of magnetic material and having the same diameters. They are axially spaced by the provision of an intermediate nonmagnetic barrier structure 31. This barrier structure may be an annulus appropriately attached to both of the annular members 29 and 30 and of high magnetic reluctance material, such as nonmagnetic metal or nonmetallic material.

The rotary drum structure including the members 29 and 30 cooperate with a driven rotor member 32 having a hub 33. This hub 33 is rigidly mounted upon the driven shaft 34. This rotor structure is made of magnetic material.

Driven shaft 34 is supported at its left hand end by the aid of a bearing structure 35 supoprted in the hub 5 of bracket 3. At its right hand end, it has load driving extension 36. The left hand portion is reduced in diameter to be accommodated in the hollow shaft 2.

Adjacent the right hand end of shaft 34, a ball bearing structure 37 is provided. This ball bearing structure is appropriately accommodated in an end bracket 38 appropriately attached to the right hand side of the casing 10.

The end bracket 38 is made of nonmagnetic material so as to confine the magnetic flux produced by a coil, as hereinafter explained, to a predetermined path.

The driven rotor structure 32 is provided with the axially separted annular magnetic members 39 and 40. These members are held apart by elements 41 of nonmagnetic material, or high reluctance material serving as a barrier for the magnetic flux. At the left hand end of the element 39 is an additional barrier 42 joining the element 39 to the rotor 32.

The rotor elements are provided with teeth 43, 44 and 45 spaced apart by the barriers 41 and 42. Furthermore, these barriers are spaced axially away from the barrier 31. The barriers 41 and 42 may have a cross section corresponding to that of elements 39 and 40.

For generating a flux pattern, a nonrotary member 46 made of magnetic material is appropriately supported on the bracket 38 as by aid of machine screws 47. This member 46 has an enlarged flange at the right hand end and a cylindrical sleeve portion 48 projecting underneath the elements 39 and 40. The inner surface of portion 48 forms a narrow air gap with the hub 33. The enlarged end 46 forms a similar air gap with element 40. Teeth 43, 44 and 45 similarly form gaps with the interior cylindrical surfaces of drum elements 29 and 30.

The exterior surface of the cylindrical portion 48 supports an exciting coil 49. This coil 49 produces a magnetic flux having a path indicated by the dotted line 50. It is seen that due to the provision of the barriers 31, 42 and 41, the magnetic flux takes a tortuous path through path 50, via teeth 43, element 29, teeth 44, element 30, teeth 45, members 40 and 46, through sleeve 48, and then back to the hub 33 of the rotor 32. In this way, there are a plurality of air gaps through which the flux must travel. This series of gaps provides a corresponding increase in the effective torque produced between the two relatively rotatable members 29, 30 and 32.

The coil 49 is held against displacement by the aid of a number of clips 51 attached to the left hand face of the cylindrical portion 48.

The right hand end of the drum portion 30 carries the vanes or fan blades 52 by the aid of which air circulation is obtained through the spaces between the teeth of the rotor 32, and outwardly through the outlet passages 24.

A conventional magneto structure 53 may be appropriately supported by the end bracket 38 so as to obtain an electromotive force corresponding to the speed of the output shaft 36.

Due to the tandem arrangement of the air gaps as defined by the flux path 50, a substantial saving in dimensions is effected.

Figure 4:
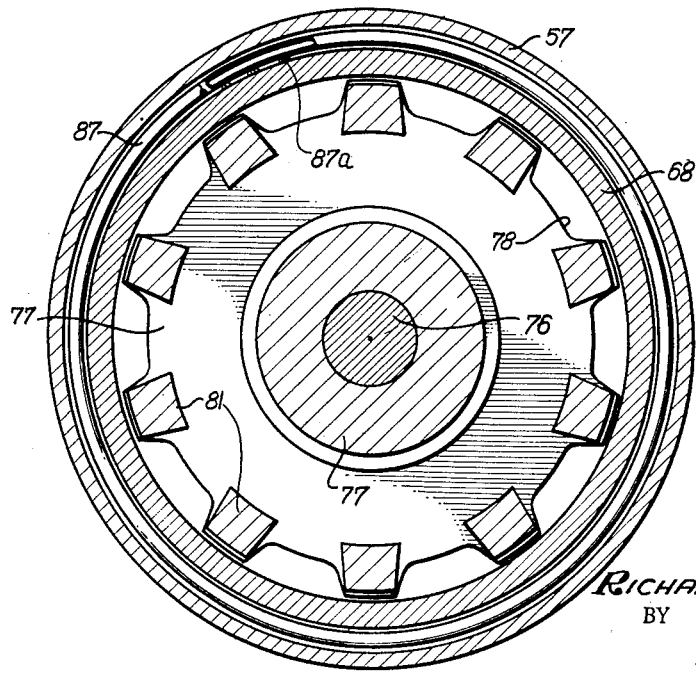
FIG. 4 is a sectional view taken along plane corresponding to line 4—4 of FIG. 3.
Figure 3:
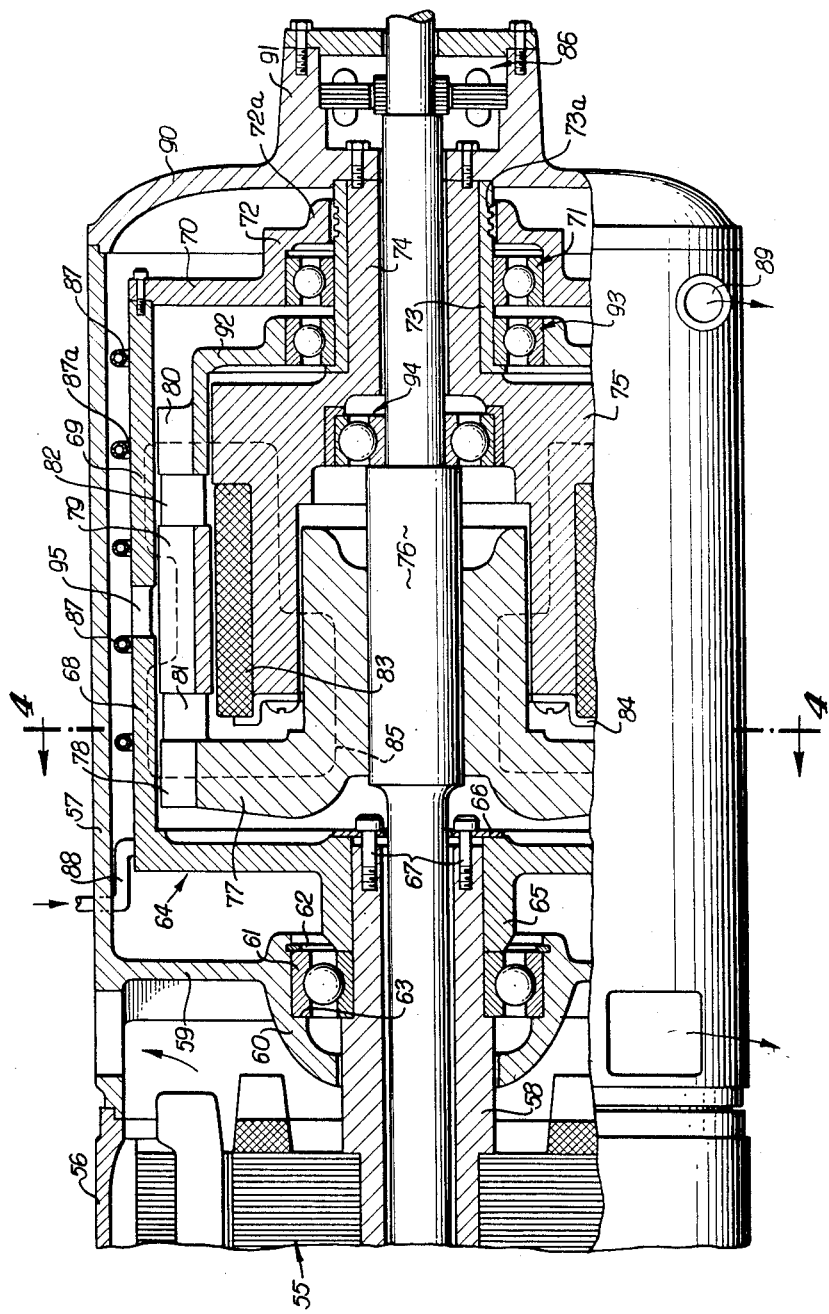
FIG. 3 is a view similar to FIG. 1 of a modified form of the invention.

In the form shown in FIGS. 1 and 2, the operating parts of the eddy current clutch are kept cool by streams of air. In the form shown in FIGS. 3 and 4, the cooling effect is obtained by the aid of water sprays, as will now be described. Furthermore, outboard bearings are provided for the relatively rotary clutch structures.

The driving motor 55 has a frame 56 which is joined to the left hand end of the casing 57. This casing 57 houses clutch parts proper.

The motor 55 has a hollow shaft 58, similar to that disclosed in FIG. 1. An imperforate wall 59 extending across the casing 57 has a hub 60 which provides a support for the bearing structure 61 for the right hand end of hollow shaft 58. This bearing structure 61 is held in place by a spring ring 62 maintaining the outer race of the bearing structure 61 against the shoulder 63 in the hub 60.

The right hand end of the shaft 58 carries a drum structure 64. This drum structure has a hub portion 65. This portion is held in place against the inner race of the bearing structure 61 by the aid of a disc 66 abutting the right hand surface of the hub 65 and held in place by the aid of machine screws 67 engaging threaded holes in the right hand end of the shaft 58.

The rotary drum structure 64 constituting the driving element of the clutch is made of magnetic material and has annular cylindrical parts 68 and 69 separated by an annular barrier 95 of nonmagnetic material or material of high magnetic reluctance.

The right hand end of the magnetic member 69 is supported by a bracket 70 made of nonmagnetic material and providing a support for an outboard bearing structure 71 for the drum structure 64. The outer race of this bearing structure 71 is mounted in the hub 72 of the bracket 70. Its inner race is mounted on sleeve 73 on the stationary hub 74. Hub 72 terminates in an elongated boss 72a that has an interior cylindrical surface opposing grooves 73a on the stationary sleeve 73. Thus a restricted path is formed for the cooling liquid between the rotary boss 72a and the nonrotary sleeve 73, confining most of the cooling liquid to the left of boss 72a.

Hub 74 forms a part of the magnetic member 75 similar to member 46 of the form shown in FIG. 1. A driven shaft 76 carries an inner rotor 77 formed generally in the same manner as the inner rotor 32 of the form shown in FIG. 1. Here again, teeth 78, 79 and 80 are formed on the rotor 77 and are held in axially spaced relation by annular members 81 and 82. The rotor 77 at its right hand end carries an outboard bearing bracket 92 accommodating the bearings 93 having an inner race mounted on nonrotary sleeve 73.

The member 75 as before carries a coil 83 held in place by the clips 84. The magnetic circuit is indicated by dotted line 85.

The driven shaft 76 is mounted at its left hand end in the same manner as shown in FIG. 1. Its central portion is supported by the bearing structure 94 mounted within the hub of the magnetic member 75.

In the present instance, a coil of pipe 87 makes several turns around the drum structure and has an inlet 88 connected to a source of cold water supply. Pipe 87 is perforated at its inner surface to provide a spray 87a discharging on the outer periphery of the drum structure 64. The discharged liquid flows downward by gravity to the bottom of casing 57. It may be drained through a drain opening 89. The bracket 90 for the casing 57 serves to close the space formed by the casing.

The bracket 90 also provides a hub 91 for the accommodation of a magneto 86.

In both forms there is an eddy current drag exerted between the rotary drum structure and the rotor 77, created by the varying magnetic fluxes occasioned by the tooth form of the rotor structure.

The inventor claims:

1. In an eddy current coupling: a support; a non-rotary magnetic member having a reduced hub at one end attached to said support; an annular coil mounted on said non-rotary magnetic member; a first rotary magnetic member substantially encompassing said non-rotary magnetic member and said coil; said non-rotary magnetic member and said first rotary magnetic member having a pair of opposed annular surfaces for defining a path of magnetic flux between opposite ends of said rotary magnetic member via said non-rotary magnetic member, said path being encompassed by said coil; a second rotary magnetic member substantially encompassing said first rotary magnetic member; said rotary magnetic members having corresponding first ends extending in side-by-side relationship about said hub; separate bearings carried by said hubs respectively mounting said first ends for rotation about said hub; and a pair of shafts respectively attached to the other ends of said rotary magnetic members; said rotary magnetic members having generally cylindrically extending opposed eddy current surfaces for creating a coupling between said rotary members.

2. In an eddy current coupling: a support; an eddy current drum having high reluctance separating means dividing the drum into magnetically isolated cylindrical parts; an inductor member in telescopic relationship with said drum and having three axially spaced non-interdigitating toothed elements each opposed to said drum; high reluctance separating means suspending the intermediate toothed element between the end toothed elements; means rotatably supporting the drum and inductor member for independent rotation about a common axis with the intermediate toothed element opposed to both of said drum parts on opposite sides of its separating means and with the end elements respectively opposed to said parts at places spaced from said separating means of said drum; and field magnet means for impressing a magnetomotive force between said end toothed elements.

References Cited in the file of this patent

UNITED STATES PATENTS

| 2,648,020 | Jaeschke | Aug. 4, 1953 |
| 2,817,029 | Jaeschke | Dec. 17, 1957 |
| 3,050,647 | Winther | Aug. 21, 1962 |

FOREIGN PATENTS

| 649,533 | Great Britain | Jan. 31, 1951 |
| 675,249 | Great Britain | July 9, 1952 |